July 27, 1926.
S. J. STRID
PIPE ANCHOR
Filed Oct. 30, 1925.
1,593,994
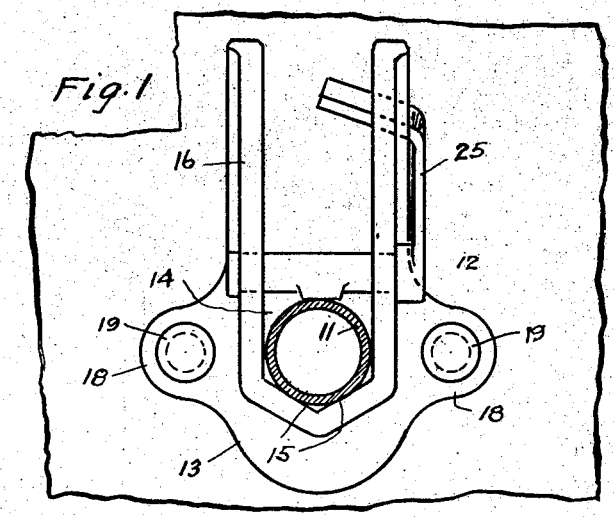
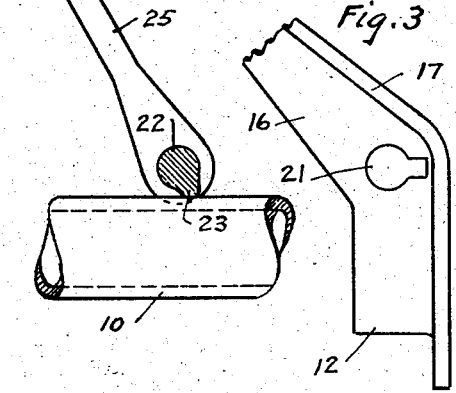
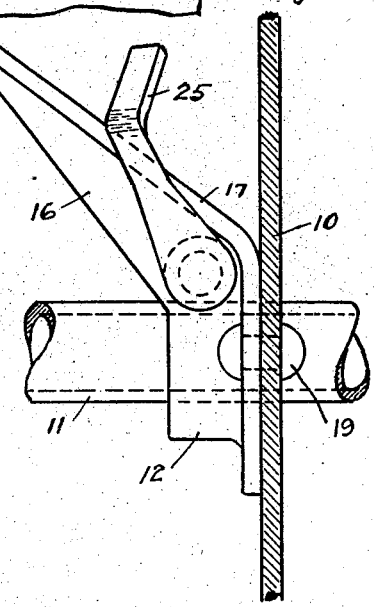
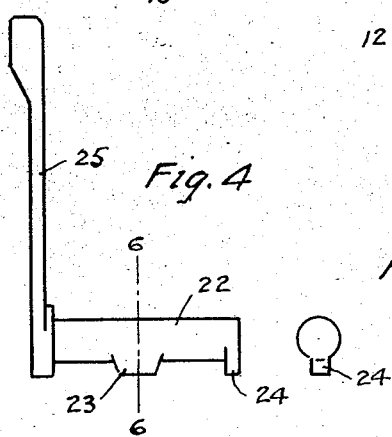
Inventor
Sven J. Strid
BY: Gillson, Mann & Cox Patented July 27, 1926.

1,593,994

UNITED STATES PATENT OFFICE.

SVEN J. STRID, OF CHICAGO, ILLINOIS.

PIPE ANCHOR.

Application filed October 30, 1925. Serial No. 65,833.

This invention relates to anchoring members, and more particularly to means for anchoring pipes and the like.

One of the objects of the invention is the provision of new and improved means for clamping pipes and the like and holding them in a definite fixed position.

Another object of the invention is the provision of new and improved clamping means on pipe anchors whereby pipes and the like may be secured in position and the clamping member permanently and efficiently locked in clamping position.

A still further object of the invention is the provision of a new and improved pipe anchor having a plurality of cam surfaces and a clamping member insertable in either direction through said anchor and having an arm adapted to be bent over on either of said surfaces for holding the parts in clamping position.

Other and further objects and advantages of the invention will appear from the following description taken in connection with the accompanying drawings, in which Fig. 1 is an elevation of the pipe anchor showing the same in pipe clamping position, with the pipe in section;

Fig. 2 is a side elevation thereof;

Fig. 3 is a side elevation of the body portion of the pipe anchor, with parts broken away;

Fig. 4 is an elevation of the clamping member;

Fig. 5 is an elevation of the key-shaped end thereof; and

Fig. 6 is a section on line 6—6 of Fig. 4, showing the clamping member in clamping position, with the ends of the pipe broken away.

Air pipes and the like used on railway cars have a tendency to creep or move longitudinally along the car, due to the sudden stopping or starting of the cars and the inertia of the pipes. While the present invention is especially adapted to retain pipes in or under cars rigidly in position under these conditions, it is understood that the device is equally as useful for supporting and anchoring pipes and the like, in other relations and under other conditions.

Referring now to the drawings, the reference numeral 10 designates a support which may be a cross member beneath a railway car, through which the pipe 11 extends. The pipe 11 may be the main air pipe or conduit through which air under compression is delivered to the auxiliary air tanks beneath the car, as is usual in such constructions.

An anchor member 12 is provided for holding the pipe 10 in fixed position. In the form of the device selected to illustrate one embodiment of the invention, the anchor member 12 comprises a body portion 13 provided with a slot or recess 14 for receiving the pipe 11. The lower marginal portion of the recess may be and preferably is provided with converging inclined surfaces forming a seat 15 against which the pipe 11 is adapted to be clamped or wedged. One or both of the side members forming the slot or recess are extended to form an arm or arms 16 having inclined or camming surfaces 17. The body portion of the anchoring member is also provided with an attaching flange or ears 18 through which fastening means such as the rivets 19 are adapted to extend for securing the members to the support 10.

Suitable means are provided for clamping the pipe against the seat 15. As shown, the arms 16 are provided with alined keyhole slots 21, see Fig. 3, in which is adapted to be inserted a key or clamping member 22. The key or clamping member 22 has an eccentric clamping lug 23 for engaging the pipe 11 and one end is provided with a laterally extending lug 24 forming with the end a key-shaped member for engaging the keyhole slot 21 in either of the members 16. The opposite end of the clamping member 22 is provided with a projection or arm 25 forming a handle for rotating the key or clamping member 22 after the same has been inserted through the openings 21.

In certain uses of the device, as on trains or other moving structures, it is necessary that the clamping member be turned sufficiently to very tightly grip the pipe to prevent the inertia of the same from causing it to creep along the body on which it is mounted, on suddenly starting or stopping the same. For this purpose the arm 25 is of sufficient length that it may be bent over and forced downward along the inclined surface 17. In practice, the anchor member is secured in position with the pipe seated in the recess, the clamping member is inserted, and on turning the same the lugs 24 will be moved out of alinement with the corresponding portion of the slot 21 whereby said member may not be removed. The outer end of the arm 25 is bent over and driven downward along the inclined surface 17 by means of a hammer, thus very firmly clamping the pipe against the converging surfaces 15. Since the surfaces 15 are substantially tangent to the curve of the pipe, and are arranged to converge downwardly, the clamping member forces the pipe into the angle thus formed whereby an exceedingly efficient clamping action is obtained.

In some instances, the anchor member will be so located that the clamping member 22 cannot be inserted from one side. In this event it may be inserted from the opposite side and on turning the same will be locked in position, the keyhole slot in each side being provided for this purpose. The anchor member is also preferably provided with the two arms 16 for the same reason. It is understood that only one of these arms is necessary, but by providing the two arms the necessity for manufacturing them in rights and lefts is obviated, and the device is adapted for universal use.

It is thought from the foregoing taken in connection with the accompanying drawings that the construction and operation of my device will be apparent to those skilled in the art, and that various changes in size, shape, proportion and details of construction may be made without departing from the spirit and scope of the appended claims.

I claim as my invention:

1. A combined pipe hanger and clamp comprising a body portion, arms extending upwardly from said body portion, said arms being provided with alined openings one of which is in the form of a key-hole slot, a key having a laterally extending lug for engaging said openings, a pipe-engaging lateral extension on said key, and means for holding said key in adjusted angular position within said openings.

2. A pipe hanger, comprising a body portion provided with perforated ears and having arms forming a seat for a pipe, one of said arms being provided with an inclined surface, a clamping member rotatably mounted in said arms, and means on said member for engaging said inclined surface for holding said clamping member in adjusted position.

3. A pipe anchor member comprising a body portion provided with a recess for receiving a pipe, means on said body portion for securing the same to a support, a rotating cam member journaled in said body portion and adapted to be turned into position to clamp a pipe in said anchor member, and means on said clamping member for engaging said anchor member for holding said clamping member in clamping position.

4. A pipe anchor member comprising a body portion having a recess therein forming a seat for the reception of a pipe, a rotating member for clamping said pipe in said seat, a member having an inclined surface, on said body portion, and an arm on said rotating member for turning the same, said arm being adapted to be bent over and along said inclined surface for holding said rotating member in clamping position.

5. A pipe anchor comprising a member having a pipe seat therein, and a cooperating inclined cam surface, a rotatable clamping element for clamping a pipe in said seat, and cam surface engaging means on said element for forcing said element into clamping engagement with a pipe in said seat.

6. A combined pipe hanger and clamp comprising a body portion, arms extending upwardly in spaced relation from said body portion to form a seat for a pipe, alined openings in said arms, a key rotatably mounted in said openings and provided with a lateral extension for clamping said pipe in said seat, and means for holding said key in adjusted pipe clamping position on said arms.

7. A pipe anchor member comprising a body portion having a recess forming a seat for a pipe, arms having inclined surfaces rigidly secured to said body portion, said arms being provided with alined apertures, a clamping member insertable in either direction through said apertures, and a projection on said member for turning the same to clamp a pipe in said seat, said projection being adapted to be bent over an adjacent inclined surface on said arms.

In testimony whereof I affix my signature.

SVEN J. STRID.